United States Patent [19]

Mangun et al.

[11] 4,087,298

[45] May 2, 1978

[54] TIRE BEAD CORE-APEX ASSEMBLY

[75] Inventors: Clifford O. Mangun, Akron; Max D. Brinkley, North Canton; Paul E. Appleby, Cuyahoga Falls, all of Ohio

[73] Assignee: The Goodyear Tire & Rubber Company, Akron, Ohio

[21] Appl. No.: 701,937

[22] Filed: Jul. 1, 1976

[51] Int. Cl.² .......................................... B29H 17/32
[52] U.S. Cl. ................................. 156/136; 156/398; 156/422; 156/460
[58] Field of Search ............... 156/123, 131, 132, 135, 156/136, 394, 398, 400–403, 414–420, 422, 460

[56] References Cited

U.S. PATENT DOCUMENTS

| 1,327,307 | 1/1920 | Brooks | 425/15 |
| 2,605,198 | 7/1952 | Haase | 156/403 |
| 3,185,607 | 5/1965 | Nebout | 156/132 |
| 3,560,301 | 2/1971 | Cantarutti | 156/401 |
| 3,787,263 | 1/1974 | Yonekawa et al. | 156/136 |
| 3,895,986 | 7/1975 | Komatsu et al. | 156/131 |
| 3,909,338 | 9/1975 | Leblond et al. | 156/136 |

FOREIGN PATENT DOCUMENTS

| 1,324,196 | 7/1973 | United Kingdom | 156/398 |

*Primary Examiner*—David Klein
*Assistant Examiner*—John E. Kittle
*Attorney, Agent, or Firm*—R. S. Washburn

[57] ABSTRACT

An apex is cohered to the bead wire bundle or core to form a unitary bead assembly. The core is supported on a rigid continuous planar surface. The apex strip in endless form is supported on the uninflated inflatable cylindrical surface of a turn-up bladder arrangement. Inflation of the bladder arrangement turns or rolls the apex angularly outward to surround the bead core and into an appropriate radial orientation and shape. The bladder action is found to cohere the apex-core so strongly together that conventional roller stitching is not required.

5 Claims, 2 Drawing Figures

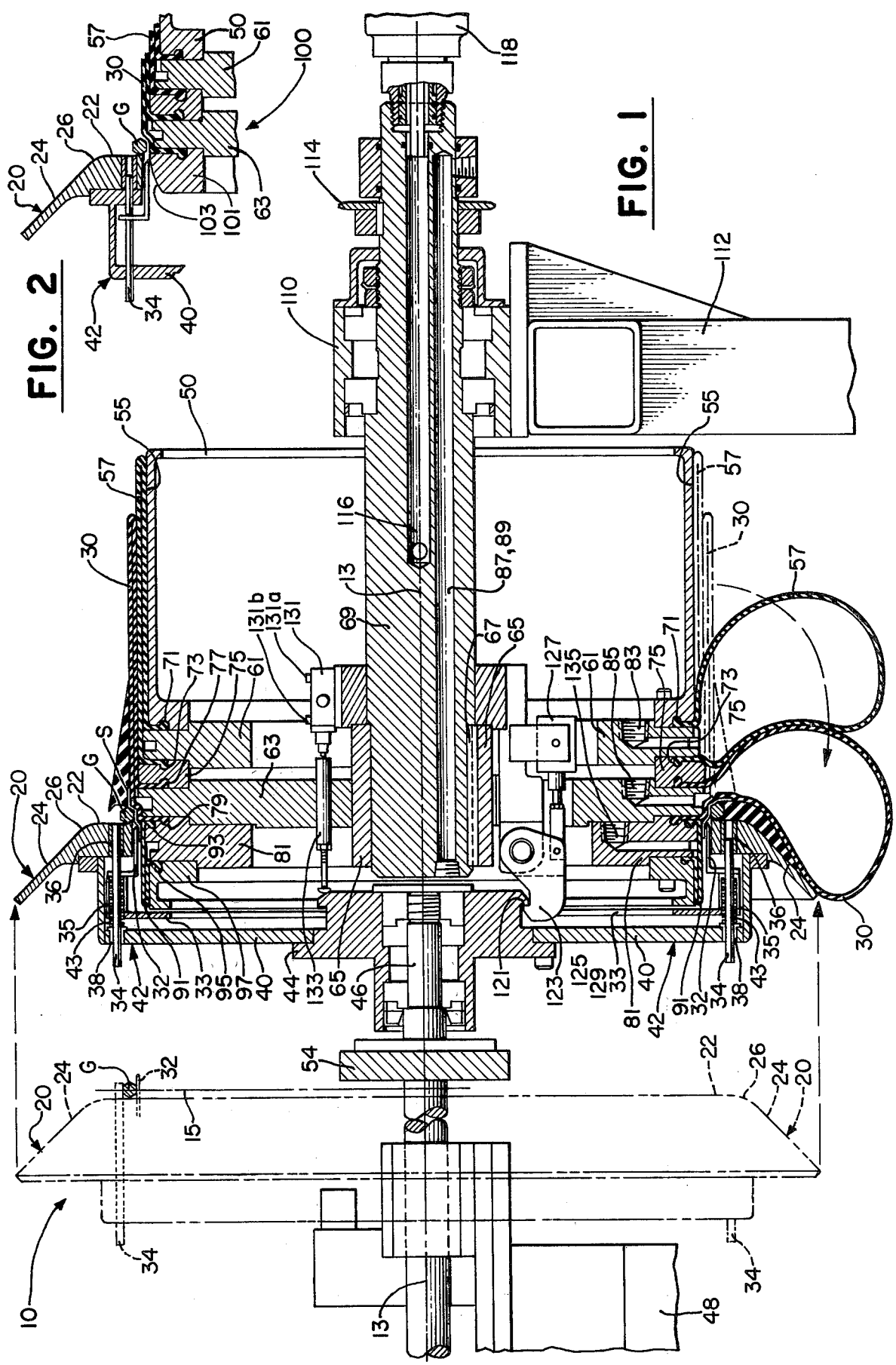

TIRE BEAD CORE-APEX ASSEMBLY

The present invention relates to the manufacture of vehicle tires and particularly to the fabrication of a bead assembly to be incorporated in a vehicle tire.

A principal object of the invention is the provision of a method and apparatus for assembling an endless inextensible wire bead bundle, referred to herein as a bead core, and an endless strip or filler of a suitable elastomeric material, referred to herein as an apex, and which assembly is a cohesive and stable assembly capable of being inserted as a unit into the assembly of a vehicle tire prior to curing thereof.

The foregoing object and others which will become apparent in the following specification are accomplished in accordance with the invention by a method of making a tire bead assembly comprising placing a bead core on a rigid continuous annular surface having a fixed diameter disposed concentrically about an axis perpendicular to the plane of said core, forming an endless apex strip circumferentially around an uninflated, inflatable annular bladder at a plane parallel to the plane of said core, moving the bead core coaxially to a location proximate to said apex strip on the bladder, inflating the bladder to move said apex strip into coplanar surrounding and coherent relation with said bead core and to contact with said annular surface, then deflating said bladder and removing said assembly for use in a tire.

The foregoing objects and others which will become apparent as the description proceeds are accomplished in accordance with the invention by an apparatus for assembling a tire bead including a bead core and an apex or filler strip comprising means for holding a bead core concentric with and in a plane normal to a central axis and having rigid continuous annular surface for supporting the core and the apex strip surrounding said core, means for moving the holding means axially, bladder support means including a rigid cylindrical surface mounted for rotation about said axis without axial movement, an inflatable annular bladder disposed coaxially and circumferentially around said cylindrical surface to extend axially of said plane in a first direction, said bladder providing a circumferentially continuous surface to receive said apex strip in endless form therearound, and operable upon inflation thereof to turn said apex strip from an initial orientation parallel to said axis to a final orientation outward of the bead core and angular with respect to said axis in coherent surrounding relation with said bead core.

To acquaint persons skilled in the most closely related arts with the principles of the invention, certain preferred embodiments illustrating the best mode now contemplated in the practice of the invention are set forth hereinbelow, being described by and with reference to the accompanying drawings in which:

FIG. 1 is an elevation in axial cross-section of an apparatus in accordance with the invention;

FIG. 2 is a partial elevation view in axial cross-section illustrating an alternative embodiment in accordance with the invention.

In the drawings, an apparatus 10 for assembling a tire bead includes means for holding a bead core G concentric with an axis 13 and in a plane 15 normal to that axis. The holding means is provided by an annular flange 20 having a radially extending portion 22 and an angularly extending portion 24. The portions 22 and 24 are blended in a smoothly curved surface 26 such that the surface of the flange cooperates, as will presently be made more clear, with an inflatable bladder 30 to provide the bead assembly with a shape suitable for incorporation in a vehicle tire.

To locate the bead core, as it is placed on the flange 20, concentrically of the axis a plurality of fingers 32 are provided in circumferentially spaced array adjacent the inner circumference of the annular surface 22. The L-shaped fingers 32 are attached to a disc 33 each by a tubular spacer 35. The disc, spacers and fingers are secured to and supported by a plurality of rods 34 which are slidably supported in the bushings 36 in the flange 20 and the bushings 38 in the annular web 40 of a carrier 42 on which the flange 20 is coaxially mounted. To urge the fingers outwardly of the flange, each spacer 35 accommodates a spring 43 disposed around the rod 34 and between the finger and web 40. As the flange 20 approaches the bladder 30 the disc 33 is pushed toward the disc 40 so as to retract the fingers and the rods. As the flange is moved away from the bladder 30, the fingers are extended by the springs to center the next bead core placed on the flange.

The carrier 42 includes a hub 44 mounted rotatably on the carrier shaft 46. The shaft 46 is coaxially aligned with the axis 13 and is mounted on a stand 48 to slide coaxially of the drum 50. The axial movement of the flange 20 is effected by a pair of conventional air cylinders (not shown) connected to a cross-bar 54.

The drum 50, which provides means for supporting inflatable bladder means includes a cylindrical surface 55 which supports thereon an inner bladder 57 extending in its uninflated condition axially and circumferentially thereof. The bladder 57 in turn supports the outer bladder 30 which extends axially of and circumferentially about the inner bladder 57. The drum 50 is attached coaxially to an air feed and clamp ring 61 and to a drum web 63 which is corotatably and coaxially secured to a hub 65 mounted, with a conventional key 67, on the shaft 69. The respective circular edges of the bladder 57 are accommodated in grooves 71, 73, respectively, in the drum 50 and in a spacer ring 75 disposed between the clamp ring 61 and the web 63. The respective circular edges of the outer bladder 30 are accommodated respectively in the grooves 77 and 79, the groove 77 being formed in the ring 75 and the groove 79 in a further clamp ring 81.

To control the inflation and deflation of the respective bladders 30 and 57, connections are made conventionally between the inlets 83 and 85 and the air passages 87 and 89 extending, parallel to the axis 13, in the center shaft 69.

The apparatus 10 provides the capability of including in the bead assembly a gum wrapper or tie strip S. The apparatus 10 illustrated in FIG. 1 thus includes a third bladder 91 the circular edges 93 and 95 of which are secured respectively in grooves of the clamp ring 81 and the output support ring 97.

Referring particularly now to FIG. 2, it will be seen that the rings 81 and 97 are replaced in the apparatus 100 by a lead-on ring or pilot 101 the radially outer surface 103 of which is tapered relative to the axis to assist in positioning the bead core concentrically of the axis 13 as the bead core is moved coaxially by the flange 20 toward the bladder 30. The bladder 91 of FIG. 1 is also omitted from the apparatus 100 of FIG. 2. Except as here described in connection with FIG. 2, the apparatus 10 and the apparatus 100 are alike in all respects.

The center shaft 69 is mounted in a pillow block bearing 110 carried on a pedestal 112 and is provided with a corotatable sprocket 114 which is connected to drive means (not shown) by which rotation of the drum is provided. Connection to the respective air passages 87, 89 and 116 is provided to the rotating shaft by conventional rotary joint 118.

The inlet of a two-way valve 131 is connected to the passage 116. The valve is fixed on the hub 65 and is operated by a spring-loaded plunger 133. The valve outlet 131a is connected to the cylinder 127 to release the hook 123 while the hub 44 depresses the plunger 133. On being moved away, the hub 44 releases the plunger 133, shifting the valve spool 131 to connect outlet 131b to the bladder 91 by way of the passage 135.

The apparatus described facilitates the practice of the method of making a tire bead assembly in accordance with the invention.

To position the bead core G concentrically with respect to the central axis 13 and in a plane perpendicular to that axis, the flange 20 is moved to the loading position illustrated in phantom outline, FIG. 1. The bead core is then disposed against the surface 22 and about the fingers 32 which are extended for the purpose by the springs 43. Alternatively, the slide rods 34 may be extended outwardly of the surface 22 to position the bead core relative to the axis. The elastomeric strip forming the apex is then wound on and about the circumferential surface of the bladder with its major dimension extending approximately parallel to the axis 13 and in close proximity to the position to be occupied by the bead core. The flange 20 is then moved axially to position the bead core suitably adjacent the apex and is locked in such position by engagement of the shoulder 121, on the hub 44, with the hook 123. As illustrated in the lower part of FIG. 1, the outer bladder 30 is then inflated thereby rotating the apex angularly with respect to the axis and to a position in which the major dimension of the apex strip extends generally radially outward of and surrounds the bead continuously in a circumferential direction. The inner bladder 57 is then inflated causing the outer bladder 30 to roll axially moving the apex strip into conformity with the flange and in particular with the surfaces 22, 26 and 24 of the flange thereby shaping the apex into its desired form. The pressure of the air within the respective bladders acts to force the apex into continuous cohesive relation with the bead core continuously and uniformly without interruption completely around the circumference of the bead core thereby effecting a cohesive unitary structure in the bead assembly. The bladders 30 and 57 are then deflated, the hook 123 is released by actuation of the air cylinder 127, and the flange 20 moved again to its loading position. The bead assembly is then removed for delivery to and use in the building of a tire and the cycle can be repeated.

In the apparatus 10, the operation is begun by first wrapping a gum strip S circumferentially about the bladder 30 and the bladder 91 to straddle the plane of the bead core. The flange 20 having a bead core positioned on the fingers 32 is then moved axially toward the bladder 30. As the flange approaches the operative position, the carrier disc 33 comes into contact with the support ring 97 causing the fingers to retract from the bead core so that the latter is disposed coaxially and symmetrically about the gum strip S. The strip of elastomer forming the apex is wrapped circumferentially about the surface of the bladder 30 to overlie an edge portion of the gum strip S. The bladder 30 is then inflated, thereby rotating the apex and the associated portion of the gum strip into a position extending radially outward from and circumferentially about the bead core. The inner bladder 57 is then inflated to urge the apex into conformity with the apex forming flange 20 and particularly the surfaces 22, 26, and 24 thereof. The flange is released and moved axially away whereupon the bladder 91 is inflated causing the remaining portion of the gum strip S to be wrapped snugly about the bead core and into adhering relation with the apex strip. The bladders are then deflated and the bead assembly removed whereupon the cycle can be repeated.

The apparatus 100, illustrated in FIG. 2, is employed when the bead core assembly omits the gum strip S. The operation is identical to that described in connection with apparatus 10 and has the advantages of avoiding any possible interferences between the bead core and the bladder 91 during the axial movement of the flange 20 into position relative to the bladder 30.

We have found that the action of inflating and deflating the bladders 30 and 57 so strongly adheres the apex to the bead core that the undesirable effects of roller stitching can be avoided. The bead assembly is securely cohered in a unitary integral structure for use in building a tire.

While certain representative embodiments and details have been shown for the purpose of illustrating the invention, it will be apparent to those skilled in the art that various changes and modifications may be made therein without departing from the spirit or scope of the invention.

What is claimed is:

1. The method of making a tire bead assembly in circular form free of forced displacement thereof from said circular form comprising placing a bead core on a rigid continuous annular surface having a fixed diameter disposed concentrically about an axis perpendicular to the plane of said bead core, forming an endless apex strip circumferentially on and around an uninflated inflatable annular bladder at a plane parallel to the plane of said core with the major cross-section dimension of the apex strip extending axially away from said core and the base of said strip in the second said plane, said bladder being coaxial with respect to said annular surface, moving the bead core coaxially to a location closely proximate to the base of said apex strip on the bladder, and then inflating the bladder to move said major dimension of the apex strip angularly into coplanar surrounding relation and to compact said strip to coherent relation with said bead core, and further to contact with said annular surface, said bead core and said apex strip being there supported uniformly without radial displacement from said circular form, then, without engaging said assembly with any stitching wheel means, deflating said bladder and removing the assembly for insertion in a tire.

2. An apparatus for assembling a tire bead including a bead core and an apex or filler strip, the apparatus providing uninterrupted circular support to said core, to said strip, and to the assembly thereof, and comprising means for holding a bead core concentric with and in a plane normal to a central axis, said means having rigid continuous annular surface means (20) for supporting the core, and the apex strip when assembled with and surrounding said core, said rigid annular surface means comprising a radial inner portion parallel to said plane and a conic outer portion sloped away from said plane and outwardly of said radial portion and connected thereto by a smoothly curved portion of said surface means, means for moving said holding means axially to position said bead core closely adjacent to the base of said apex strip and to release said assembly when the latter has been formed, bladder support means including a rigid cylindrical surface mounted for rotation about said axis without axial movement, an inflatable annular bladder attached coaxially and circumferentially around said cylindrical surface near its end proximate to said plane to extend axially away from said plane, said bladder providing a circumferentially continuous strip contacting surface to receive said apex strip in endless form therearound with the major cross-section dimension of said strip extending in a direction axially away from said bead core to form said assembly, and operable upon inflation thereof to expand angularly toward said annular surface means thereby to turn said apex strip from an initial orientation parallel to said axis to a surrounding and coherent relation with said bead core and to a final orientation outward of the bead core and angular with respect to said axis.

3. Apparatus as claimed in claim 2, further comprising another inflatable bladder (91) disposed on said bladder support means coaxially of and closely adjacent to the first mentioned bladder and extending axially oppositely thereof with respect to said plane.

4. Apparatus as claimed in claim 2, said means for supporting including a plurality of bead core engaging means extending axially outwardly of said annular surface to engage the radially inward surface of the bead core, said engaging means being retractable axially of said annular surface in response to approach of said annular surface to said inflatable annular bladder from a position spaced axially therefrom and without contact between said engaging means and said bladder.

5. Apparatus as claimed in claim 2, further comprising a rigid circularly continuous pilot ring (103) disposed coaxially on said bladder support means and having a radially outward surface convergent axially outwardly of the bladder support means and engageable with the radially inner surface of a bead core carried by said holding means.

* * * * *